US008387070B2

(12) United States Patent
Chacko et al.

(10) Patent No.: US 8,387,070 B2
(45) Date of Patent: *Feb. 26, 2013

(54) OBJECT REQUEST BROKER

(75) Inventors: Joseph Chacko, Winchester (GB); Neil Richards, Hedge End (GB); Erin Schnabel, Poughkeepsie, NY (US); Katherine Tsui, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 12/911,015

(22) Filed: Oct. 25, 2010

(65) Prior Publication Data

US 2011/0271288 A1    Nov. 3, 2011

Related U.S. Application Data

(63) Continuation of application No. 11/470,437, filed on Sep. 6, 2006, now Pat. No. 7,882,506.

(30) Foreign Application Priority Data

Sep. 10, 2005   (GB) .................................. 0518515.2

(51) Int. Cl.
  *G06F 9/54*  (2006.01)
(52) U.S. Cl. ..................................................... 719/316
(58) Field of Classification Search ................... 719/316
  See application file for complete search history.

(56) References Cited

U.S. PATENT DOCUMENTS 6,697,878 B1   2/2004  Imai
7,533,156 B1   5/2009  Jeyaranman et al.

OTHER PUBLICATIONS

Coulouris; Distributed Systems Concepts and Design; Pearson Education Ltd. 3rd Ed (2001); Essex, England; pp. 138-144.
Seifert, R; The Switch Book: The Complete Guide to LAN Switching Technology; Wiley Computer Publishing (2000); pp. 116-117.
Keller, A; Towards CORBA-based Enterprise Management: Managing CORBA-based Systems with SNMP Platforms; Enterprise Distributed object Computing Workshop; 1998; EDOC '98.
Russell, C; Java Data Objects (Jul. 2001); Retrieved from http://www.theserverside.com/tt/articles/content/JDO/article.html.
Webster's II New College Dictionary; Houghton Mifflin Company; Boston New York.
Coulson; Implementing the CORBA GIOP in a High-Performance Object Request Broker Environment; ACM Distributed Computing Cournal, vol. 14, No. 2; Springer Verlag Press, 2001.
Orfali; Instant CORBA; Wiley Computer Publishing (1997), pp. 7-17.

*Primary Examiner* — Hyung S. Sough
*Assistant Examiner* — Brian Wathen
(74) *Attorney, Agent, or Firm* — David Mims; Robert C. Rolnik (57) ABSTRACT

A computer-implemented system for receiving an incoming message including a message header and a message body in General Inter-ORB Protocol (GIOP) type format, the system comprising: an external ORB element based on a computer configured to convert the header of the incoming message to an implementation-specific format, and configured to provide the header in implementation-specific format with the body in GIOP type format to a distribution mechanism for identifying an appropriate target server for processing the body of the incoming message; and an internal ORB element based on an originating server configured to convert the body of the outgoing message to CORBA GIOP type format to a distribution mechanism.

4 Claims, 7 Drawing Sheets

OBJECT REQUEST BROKER

This application is a continuation application of Ser. No. 11/470,437 filed Sep. 6, 2006 now U.S. Pat. No. 7,882,506.

BACKGROUND OF THE INVENTION

1. Field of the Invention

The present invention relates to object request brokers and more specifically to providing resource efficient communication between object request brokers in a distributed computing environment.

2. Description of the Related Art

Object request brokers (ORBs) provide for access to software objects which may reside remote to a requester, such as in a different software process, on a different machine in a network or on a different network altogether. Standards define how ORBs can be implemented and how they interact to support different languages, networks and computing platforms. The Common Object Request Broker Architecture (CORBA®, a registered trademark of the Object Management Group) is a dominant standard architecture which uses a language-neutral format for messages exchanged between ORBs known as the General Inter-ORB Protocol (GIOP).

Conversion from language specific and machine specific data and message formats is expensive in terms of resource utilization. It is a well established optimization to allow local object accesses to bypass much of the conversion process when certain, specific, conditions are satisfied to confirm that an object access is indeed local. When an application is to be distributed over several processes or machines (such as several computer systems arranged into a grid architecture), a distribution mechanism can be employed having an associated ORB to refer GIOP messages to appropriate target servers. For example, such a distribution mechanism might be employed to provide load balancing functionality between a set of servers. When such distribution mechanisms are employed, communication of GIOP request messages from a client computer system to a target server can involve many conversions of the request message between the GIOP format and an implementation-specific format. This results from the need to receive the message at the distribution mechanism itself, and subsequently dispatch the message from the distribution mechanism to a target server. Messages are required to take the GIOP format for communication between ORBs, such as across an Internet Inter-Operability Protocol (IIOP). However, for use by a message recipient or a message originator, such as a distribution mechanism or a target server, messages must be converted to an implementation-specific format. Such an implementation-specific format is a graph of Java® objects (Java is a registered trademark of Oracle Corp.), although any number of alternative implementation-specific formats can be used depending upon a particular computing platform.

Figure 1:
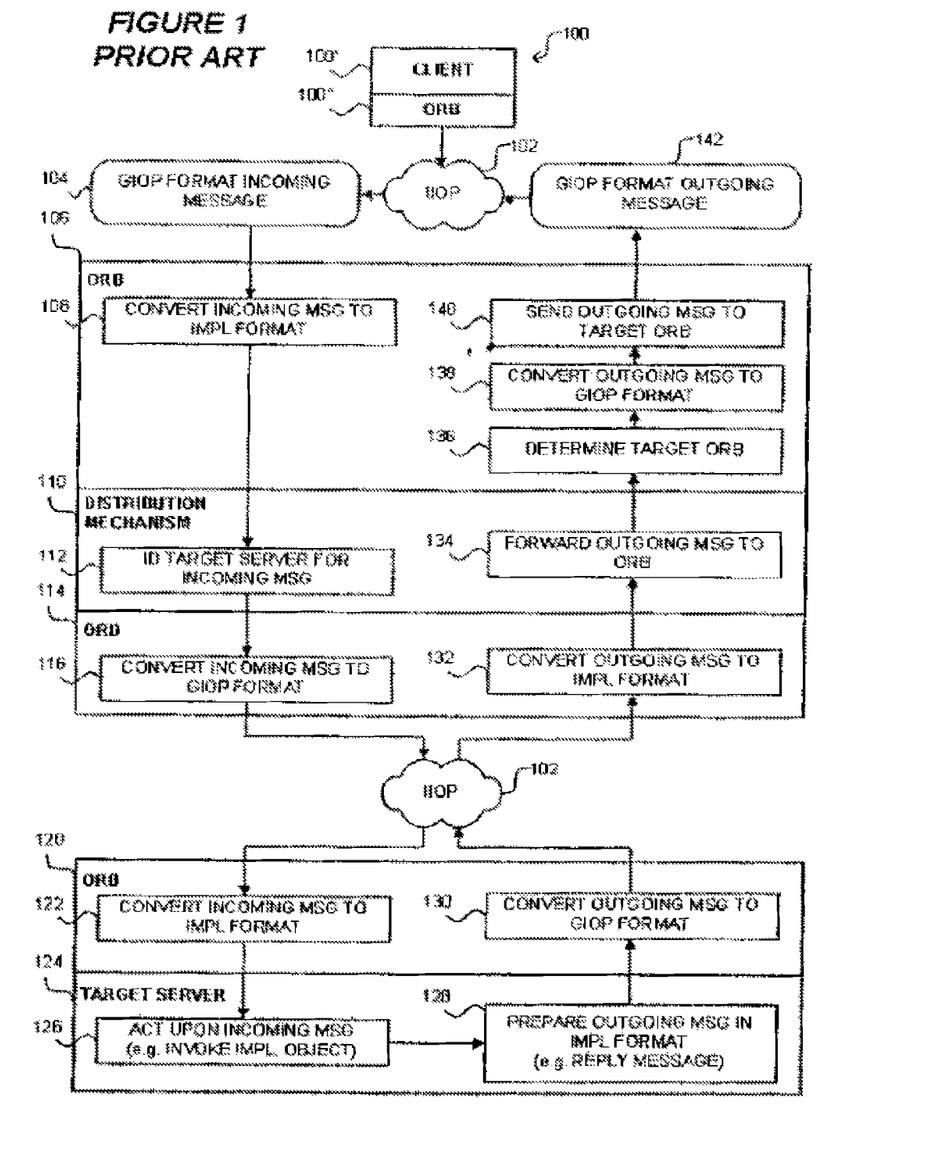
FIG. 1 is a schematic diagram of a communication between a client computer system and a target server computer system in the prior art.

FIG. 1 is a schematic diagram of a communication between a client computer system 100 and a target server computer system 124 in the prior art. The client computer system 100 includes client software 100' and an ORB 100". The client computer system 100 is communicatively connected to any number of other computer systems via an IIOP network 102. The client computer system prepares a message 104 in GIOP format for dispatch over the IIOP network 102 via the ORB 100'. Message 104 can be any GIOP message, such as a request message. The message 104 is received by an ORB 106 associated with the distribution mechanism 110. The message 104 is considered an incoming message from the point of view of a receiving distribution mechanism 110. Initially, at step 108, the ORB 106 converts the incoming message 104 into an implementation-specific format and provides the message 104 in implementation-specific format for processing by the distribution mechanism 110 itself. At step 112, the distribution mechanism 110 identifies an appropriate target server 124 for processing the incoming message 104, and instigates a process of communicating the incoming message 104 to the target server 124. Identification of an appropriate target server 124 can be based on the contents of the incoming message 104, such as a header of the incoming message. Prior to communication of the incoming message 104 to the target server 124 it is converted back into the GIOP format at step 116 by an ORB 114 associated with the distribution mechanism 110. It is required to be converted back to the GIOP format in order to be communicated to the target server 124 across the IIOP network 102. ORBs 106 and 114 associated with the distribution mechanism 110 can be identical, equivalent or indeed the same ORB. Subsequently, ORB 114 communicates the incoming message 104 to the target server 124 over the IIOP network 102.

On receipt of the incoming message 104 by the target server 124, the incoming message is initially processed by an ORB 120 associated with the target server which converts, at step 122, the incoming message 104 from its GIOP format to the implementation-specific format. Subsequently, at step 126 the target server 124 is finally able to process the substantive content of the message. For example, processing of a GIOP message can involve an invocation of an implementation object. Subsequently, the target server 124 determines that an outgoing message 142 is required to be returned to the client 100 as a reply message corresponding to the incoming message 104 (although not all incoming messages will necessarily warrant a reply). At step 128 the target server prepares the outgoing message 142 in the implementation-specific format for passing to the ORB 120. At step 130, the ORB 120 converts the outgoing message 142 in implementation-specific format to GIOP format for communication across the IIOP® protocol network 102 to the distribution mechanism 110. Once communicated across the IIOP network 102, the outgoing message 142 is initially processed by the ORB 114 associated with the distribution mechanism 110 which converts the outgoing message 142 in GIOP format to implementation-specific format at step 132 for processing by the distribution mechanism 110. The only role of the distribution mechanism at this point is to forward the outgoing message 142 to the ORB 106, which subsequently determines the target ORB 100" at step 136. ORB 106 further converts the outgoing message 142 in implementation-specific format into GIOP format for communication across the IIOP® protocol network 102. Finally, the ORB 106 sends the outgoing message 142 in GIOP format to the client 100 across the IIOP® protocol network 102, for receipt by ORB 100" of client 100.

Thus, it will be appreciated that such communication between a client 100 and a target server 124 via a distribution mechanism using ORBs and IIOP networks is resource intensive since messages must be converted numerous times. For example, the incoming message 104 is converted three times at steps 108, 116 and 122. Similarly, the outgoing message 142 is converted three times at steps 130, 132 and 138. These conversions constitute a significant processing overhead in distributed software using object request broker architectures.

One approach to alleviate the overhead of conversion is provided by CORBA. In this approach, GIOP messages are divided into two parts: a header; and a body. Forwarding decisions (e.g. Workload distribution) can be made upon inspection of the message header alone. Using this approach, on receipt at a distribution mechanism, a target server is identified based upon an inspection of the message header alone, and a reply message is sent to the client with information relating to the location of the appropriate target server. This approach reduces the amount of conversion of GIOP messages, since only the message header needs to be converted by the distribution mechanism. However, this approach requires further network communication to take place since the distribution mechanism communicates with the client to inform the client of the location of the target server, and the client must then restart its communication with the target server. Furthermore, there are additional disadvantages to this approach: the target servers must be accessible to the client (i.e. they cannot be in a secure or private part of a network); in the event that a reply message is required, the client must be accessible to the target server; and the distribution mechanism is able to only intervene to implement workload distribution functionality once for a client—once the client is informed of the location of the target server, it can communicate directly with the target server for all future requests.

It would therefore be advantageous to provide for effective GIOP communication between a client and a server employing a distribution mechanism with reduced message conversion and network traffic requirements, whilst providing that target servers and clients need not be accessible to each other and the distribution mechanism is able to intervene to implement workload distribution functionality on a per-request basis.

SUMMARY OF THE INVENTION

The present invention accordingly provides, in a first aspect, an object request broker (ORB) for receiving an incoming message including a message header and a message body in General Inter-ORB Protocol (GIOP) type format, the ORB comprising: an external ORB element for converting the header of the incoming message to an implementation-specific format, and for providing the header in implementation-specific format with the body in GIOP type format to a distribution mechanism for identifying an appropriate target server for processing the body of the incoming message; and an internal ORB element associated with the identified target server for converting the body of the incoming message to an implementation-specific format for use by the target server to process the message.

Preferably the implementation-specific format is a graph of Java objects.

Preferably communication between the external ORB element and the internal ORB element is provided by the distribution mechanism.

Preferably the communication of an item of data in implementation-specific format includes serializing the item of data.

The present invention accordingly provides, in a second aspect, an object request broker (ORB) for sending an outgoing message, the outgoing message including a message header and a message body in an implementation-specific format, the ORB comprising: an external ORB element for converting the header of the outgoing message to a General Inter-ORB Protocol (GIOP) type format and for sending the header and body in GIOP type format to a target ORB; and an internal ORB element associated with an originating server for converting the body of the outgoing message to GIOP type format, and for providing the header in implementation-specific format with the body in GIOP type format to a distribution mechanism for forwarding to the external ORB element.

The present invention accordingly provides, in a third aspect, a method of an object request broker (ORB) for receiving an incoming message including a message header and a message body in General Inter-ORB Protocol (GIOP) type format, the method comprising the steps of: an external ORB element converting the header of the incoming message to an implementation-specific format and providing the header in implementation-specific format with the body in GIOP type format to a distribution mechanism for identifying an appropriate target server for processing the body of the incoming message; and an internal ORB element associated with the identified target server converting the body of the incoming message to an implementation-specific format for use by the target server to process the message.

The present invention accordingly provides, in a fourth aspect, a method in an object request broker (ORB) for sending an outgoing message, the outgoing message including a message header and a message body in an implementation-specific format, the method comprising the steps of: an external ORB element converting the header of the outgoing message to a General Inter-ORB Protocol (GIOP) type format and sending the header and body in GIOP type format to a target ORB; and an internal ORB element associated with an originating server converting the body of the outgoing message to GIOP type format, and sending the header in implementation-specific format with the body in GIOP type format to a distribution mechanism for forwarding to the external ORB element.

The present invention accordingly provides, in a fifth aspect, a method of an object request broker (ORB) for responding to a request message from a client ORB, the request message including a message header and a message body in General Inter-ORB Protocol (GIOP) type format, the method comprising the steps of: an external ORB element converting the header of the request message to an implementation-specific format and sending the header of the request message in implementation-specific format with the body of the request message in GIOP type format to a distribution mechanism for identifying an appropriate target server for processing the body of the request message; an internal ORB element associated with the identified target server converting the body of the request message to an implementation-specific format for use by the target server to process the message; the target server processing the body of the request message to generate a reply message including a message header and a message body in implementation-specific format; the internal ORB element associated with the identified target server converting the body of the reply message to GIOP type format, and sending the header of the reply message in implementation-specific format with the body of the reply message in GIOP type format to the distribution mechanism for forwarding to the external ORB element; and the external ORB element converting the header of the reply message to GIOP type format and sending the header of the reply message in GIOP type format and the body of the reply message in GIOP type format to the client ORB.

The present invention accordingly provides, in a sixth aspect, an apparatus comprising: a central processing unit; a memory subsystem; an input/output subsystem; and a bus subsystem interconnecting the central processing unit, the memory subsystem, the input/output subsystem; and any of the object request brokers described above.

The present invention accordingly provides, in a seventh aspect, a computer program element comprising computer program code to, when loaded into a computer system and executed thereon, cause the computer to perform the steps of any of the methods described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 2:
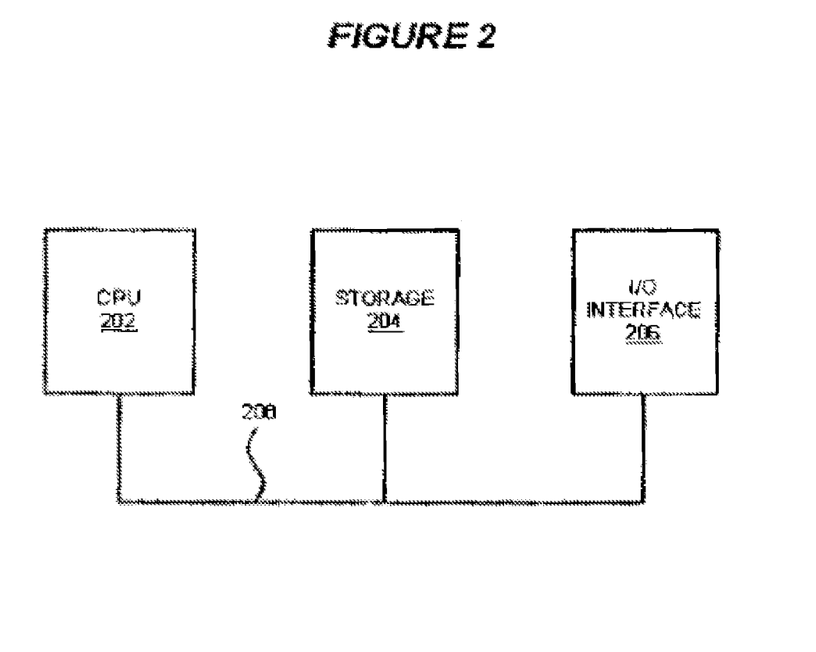
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
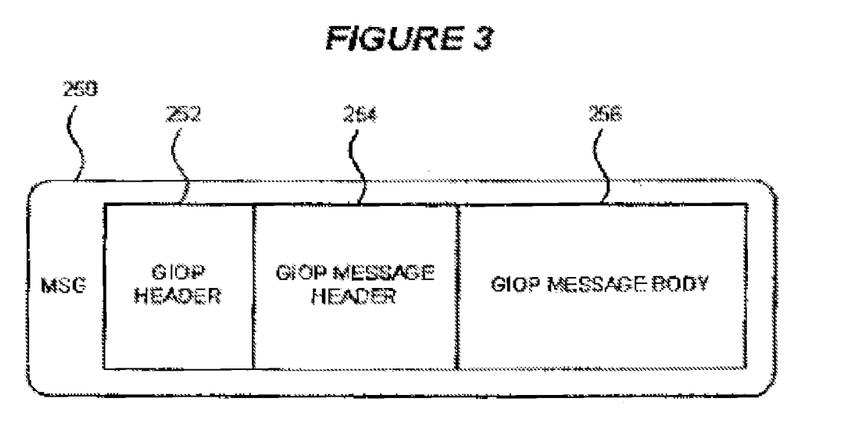
FIG. 3 is a schematic diagram of a general inter-ORB protocol message for use in embodiments of the present invention.

FIG. 3 is a schematic diagram of a general inter-ORB protocol (GIOP) message 250 for use in embodiments of the present invention. The GIOP message 250 is structured as is well known in the art, with a GIOP header 252 and a GIOP message section including a GIOP message header 254 (often referred to as the 'message header') and a GIOP message body 256 (often referred to as the 'message body'). Collectively, the GIOP header 252 and the GIOP message header 254 can be used by a distribution mechanism to determine an appropriate target server for the GIOP message 250. The message header 254 can include service context information, such as security information, and such information can be inserted into the message header 254 by an ORB prior to transmission across an IIOP network. Whilst the message of FIG. 3 and other messages in the preferred embodiments of the present invention are described as being convertible to and from a GIOP format, it will be appreciated by those skilled in the art that any format for inter-ORB communications, such as a GIOP type format, could be used.

Figure 4:
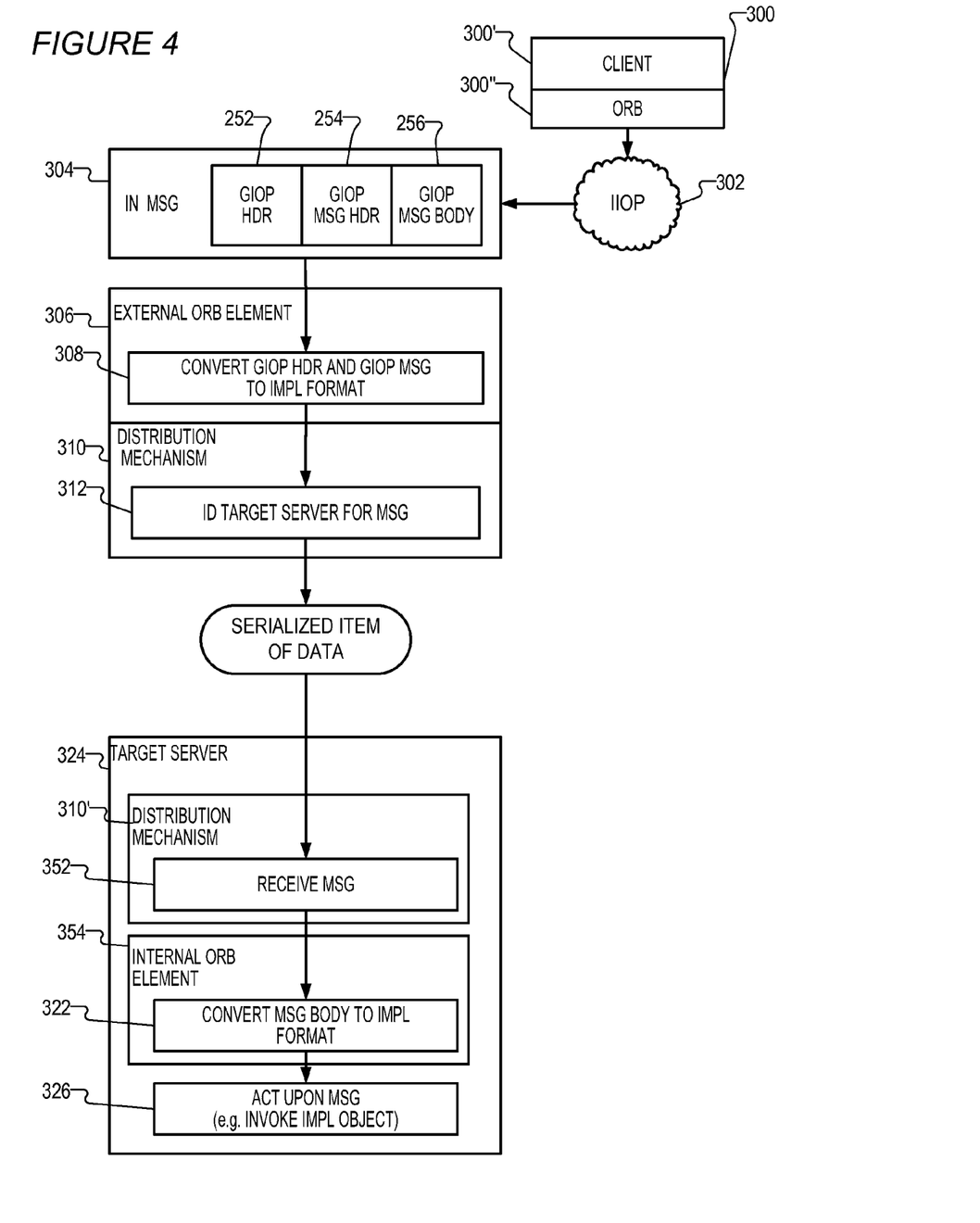
FIG. 4 is a schematic diagram of communication of an incoming message from a client computer system to a target server computer system in accordance with a preferred embodiment of the present invention.

FIG. 4 is a schematic diagram of communication of an incoming message 304 from a client computer system 300 to a target server computer system 324 in accordance with a preferred embodiment of the present invention. The client computer system 300 includes client software 300 and an ORB 300'. The client computer system 300 is communicatively connected to any number of other computer systems via an IIOP® protocol network 302. The client computer system prepares a message 304 in GIOP format for dispatch over the IIOP® protocol network 302 via the ORB 300'. Message 304 can be any GIOP message, such as a request message, and includes a GIOP header 252, a GIOP message header 254 and a GIOP message body 256.

The message 304 is directed to a distribution mechanism which comprises a first distribution mechanism component 310 and a plurality of second distribution mechanism components 310'. Each of the plurality of second distribution mechanism components 310' is associated with a target server 324. The distribution mechanism 310, 310' provides a workload balancing facility between a set of target servers, of which target server 324 is a member. The distribution mechanism 310, 310' further provides communications facilities between the first distribution mechanism component 310 and the second distribution mechanism component 310'. The communications facilities between the components of the distribution mechanism 310, 310' can be any effective communications mechanism, such as an open or proprietary networking standard. For example, where the implementation-specific format of a message is a graph of Java objects, the communications mechanism provided by the distribution mechanism 310, 310' can include serialization of Java objects for communication over a suitable transport protocol.

The distribution mechanism 310, 310' has associated an ORB 306, 354 comprising an external ORB element 306 and an internal ORB element 354. The external ORB element 306 is associated with the first distribution mechanism component 310 whilst the internal ORB element 354 is associated with the target server 324. In use, the external ORB element 306 initially receives the message 304, which is considered an incoming message 304 from the point of view of the distribution mechanism 310, 310'. Subsequently, the external ORB element converts the GIOP header 252 and the message header 254 of the incoming message 304 into an implementation-specific format at step 308. The first distribution mechanism component 310 is then able to access the GIOP header 252 and the message header 254 in order to determine an appropriate target server 324 to receive the incoming message 304. Subsequently, the first distribution mechanism component 310 communicates the incoming message 304 (having headers 252 and 254 in implementation-specific format and a message body 256 in GIOP format) to the appropriate target server 324 where it is initially received by the second distribution mechanism component 310'. Subsequently, the incoming message 304 is received by the internal ORB element 354 which converts the message body 256 into implementation-specific format at step 322. At this point, the entire incoming message 304 is in implementation-specific format for use by the target server 324. Subsequently, the target server processes the incoming message 304 accordingly, which is provided entirely in the implementation-specific format.

Thus the ORB 306, 354 associated with the distribution mechanism 310, 310' is split between a first distribution mechanism component 310 and a plurality of second distribution mechanism components 310' such that only the headers 252, 254 of the incoming message need to be converted to implementation-specific format for use by the distribution mechanism 310, 310'. The distribution mechanism 310, 310' itself manages communication of the incoming message 304 (having headers 252 and 254 in implementation-specific format and a message body 256 in GIOP format) using any communications mechanism between the first distribution mechanism component 310 and the second distribution mechanism component 310'. Allowing the distribution mechanism 310, 310' to manage this communication to the target server 324 overcomes a need to convert the incoming message 304 into a GIOP format for this communication. Furthermore, since the ORB 306, 354 is split between an external ORB element 306 which undertakes conversion of the headers 252, 254 only, and an internal ORB element 354 which undertakes conversion of the message body 256 only, each part of the incoming message 304 is converted only once. Thus, in this way, the message conversion requirement is reduced over that of the prior art. Furthermore, since there is no requirement for the client 300 to communicate directly with the target server 324, the network traffic requirements are reduced over those of the CORBA approach in the prior art and target server 324 and client 300 need not be accessible to each other. This also provides for the distribution mechanism 310, 310' to intervene to implement workload distribution functionality on a per-request basis since all requests are channeled through the distribution mechanism 310, 310'.

Figure 5:
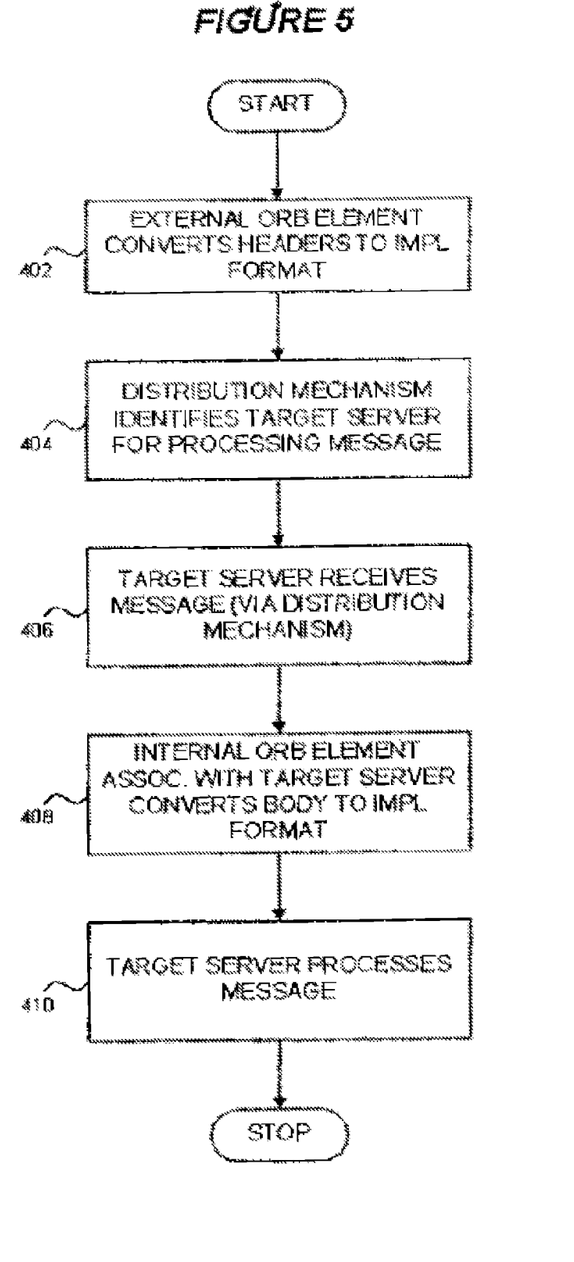
FIG. 5 is a flowchart of a method of communication of an incoming message from a client computer system to a target server computer system in accordance with a preferred embodiment of the present invention.

FIG. 5 is a flowchart of a method of communication of an incoming message 304 from a client computer system 300 to a target server computer system 324 in accordance with a preferred embodiment of the present invention. At step 402, the external ORB element 306 converts the GIOP header 252 and the message header 254 of the incoming message 304 to an implementation-specific format. At step 404, the distribution mechanism 310 identifies a target server 324 for processing the incoming message 304. At step 406 the target server 324 receives the incoming message 304 via the distribution mechanism 310'. At step 408 the internal ORB element 354 associated with the target server 324 converts the message body 256 to the implementation-specific format. Finally, at step 410, the target server 324 is able to process the incoming message 304 which is provided entirely in the implementation-specific format.

Figure 6:
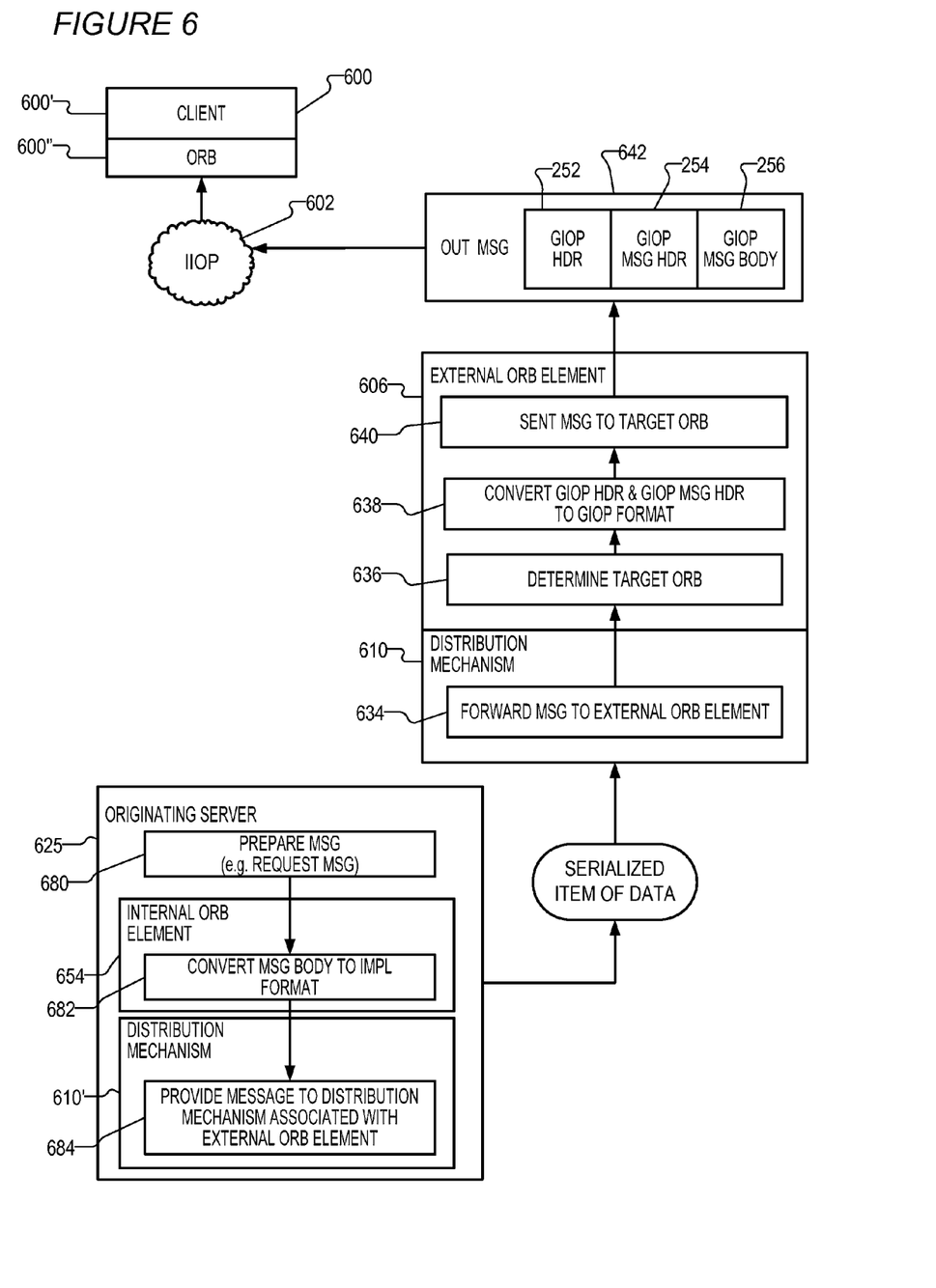
FIG. 6 is a schematic diagram of communication of an outgoing message from an originating server computer system to a client computer system in accordance with a preferred embodiment of the present invention.

FIG. 6 is a schematic diagram of communication of an outgoing message 642 from an originating server computer system 624 to a client computer system 600 in accordance with a preferred embodiment of the present invention. Many of the elements of FIG. 6 are identical to those described above with respect to FIG. 4 and these will not be repeated here. The originating server 624 is equivalent in many respects to the target server 324 of FIG. 3, except that in FIG. 6 the originating server 624 acts as a source of an outgoing message 642 as opposed to a recipient of an incoming message 304. The originating server 624 initially prepares a new outgoing message 642 in implementation-specific format at step 680. For example, the outgoing message is a request message, and can have a GIOP header 252, a message header 254 and a message body 256, in implementation-specific format. Subsequently, message body 256 of the outgoing message 642 is converted to GIOP format by the internal ORB element 654 at step 682 before being provided to the distribution mechanism 610', 610. The distribution mechanism 610 forwards the outgoing message 642 (with the headers 252 and 254 in implementation-specific format and the message body 256 in GIOP format) to the external ORB element 606 at steps 684 and 634. Subsequently, the external ORB element 606 determines the target ORB 600" for this message at step 636, and converts the GIOP header 252 and the message header 254 of the outgoing message 642 into GIOP format at step 638. It is necessary for the headers 252 and 254 to be converted to GIOP format by the external ORB element 606 because it is only at this stage that the insertion of appropriate service context information can take place into these headers 252, 254. Finally, the external ORB element sends the outgoing message 642 to the target ORB 600" of the client 600 over the IIOP network 602.

Figure 7:
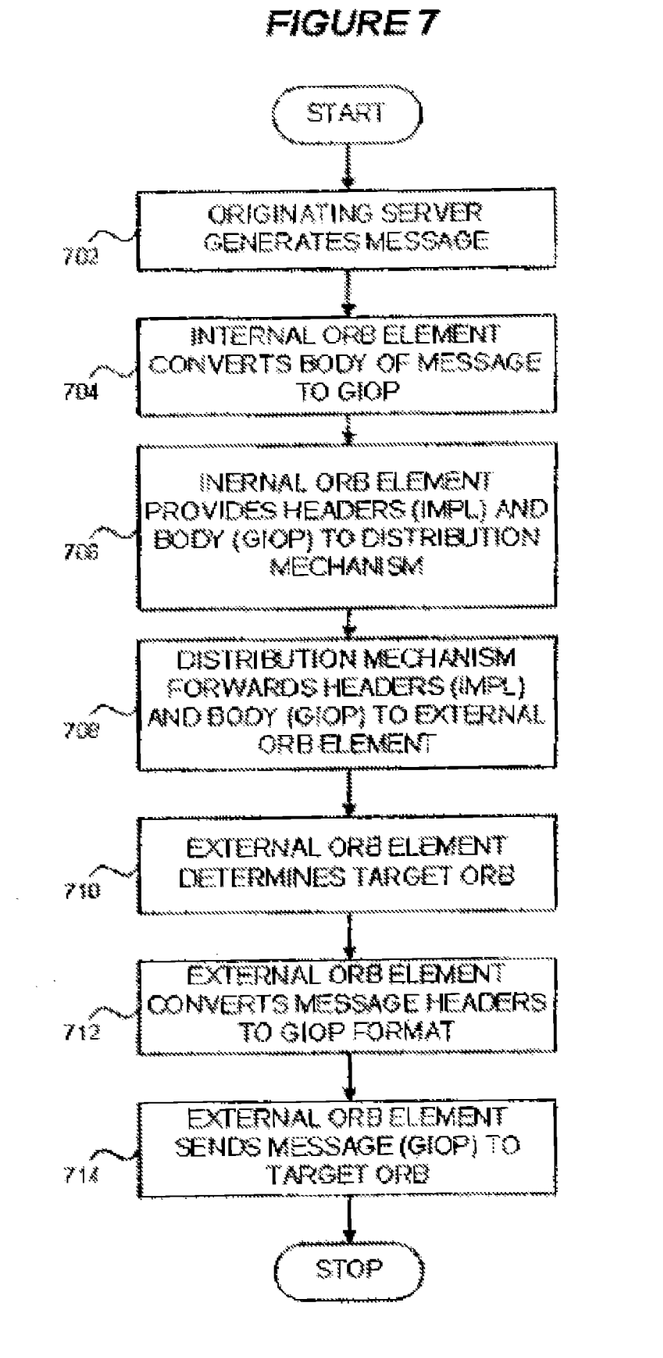
FIG. 7 is a flowchart of a method of communication of an outgoing message from an originating server computer system to a client computer system in accordance with a preferred embodiment of the present invention.

FIG. 7 is a flowchart of a method of communication of an outgoing message 642 from an originating server computer system 624 to a client computer system 600 in accordance with a preferred embodiment of the present invention. At step 702, the originating server 624 generates a new outgoing message 642. At step 704 the internal ORB element 654 converts the message body 256 of the outgoing message 642 into GIOP format. At step 706 the internal ORB element 654 provides the outgoing message 642 with headers 252 and 254 in implementation-specific format and message body 256 in GIOP format to the distribution mechanism 610, 610'. At step 708 the distribution mechanism forwards the outgoing message 642 to the external ORB element 606, which determines the target ORB at step 710 and converts the message headers 252, 254 to GIOP format at step 712. Finally, the external ORB element 606 sends the outgoing message 642 entirely in GIOP format to the client 600.

Figure 8:
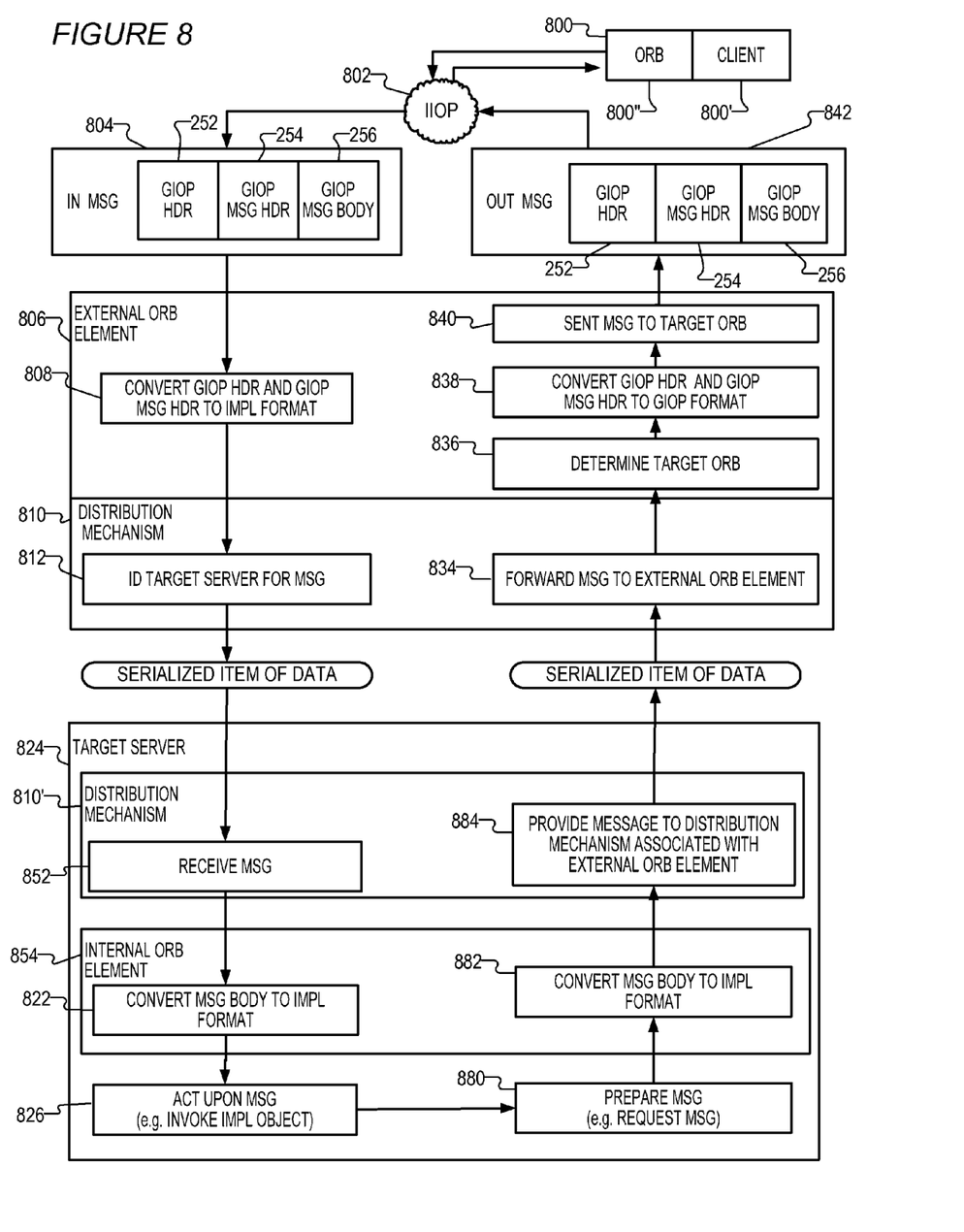
FIG. 8 is a schematic diagram of two-way communication between a client computer system and a target server computer system in accordance with a preferred embodiment of the present invention.
Figure 9:
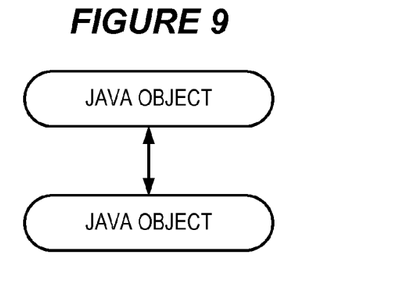
FIG. 9 is a graph of objects in accordance with an illustrative embodiment of the invention.

FIG. 8 is a schematic diagram of two-way communication between a client computer system 800 and a target server computer system 824 in accordance with a preferred embodiment of the present invention. Many of the elements of FIG. 6 are identical to those described above with respect to FIGS. 4 and 6, and these will not be repeated here. Initially, an incoming message 804 in GIOP format originating from client 800 is received by external ORB element 806 from the IIOP network 802. The External ORB element 806 converts the GIOP header 252 and GIOP message header 254 of the incoming message 804 into implementation-specific format at step 808. Subsequently, the distribution mechanism 810 identifies an appropriate target server 824 for processing of the message at step 812, and the incoming message 804 (with headers 252, 254 in implementation-specific format and message body in GIOP format) is communicated to the target server 824 via the distribution mechanism 810. Subsequently, the internal ORB element 854 converts the GIOP message body 256 of the incoming message 804 to the implementation-specific format at step 822, and the target server 824 is able to process the incoming message 804, now entirely in implementation-specific format, at step 826.

Subsequently, the target server prepares an outgoing message 842, such as a reply message, in implementation-specific format at step 880. The internal ORB element 854 converts the message body 256 of the outgoing message 842 into GIOP format at step 882. The internal ORB element then provides the outgoing message 842 (with the headers 252, 254 in implementation-specific format and the message body 256 in GIOP format) to the distribution mechanism 810, 810' for forwarding to the external ORB element 806 at steps 884 and 834. Subsequently, at step 836 the external ORB element 806 determines a target ORB 800" for the outgoing message 842 and converts the GIOP header 252 and the message header 254 to GIOP format at step 838. Finally, at step 840, the external ORB element sends the outgoing message 842, now entirely in GIOP format, to the client 800 across the IIOP network 802.

In this way, the message conversion requirement is reduced over that of the prior art since each element of the incoming message 804 (i.e. The GIOP header 252, the message header 254 and the message body 256) is converted only once from GIOP format to implementation-specific format. Similarly, each element of the outgoing message is also converted only once from implementation-specific format to GIOP format. Furthermore, since there is no requirement for the client 800 to communicate directly with the target server 824, the network traffic requirements are reduced over those of the CORBA approach in the prior art and target server 824 and client 800 need not be accessible to each other. This also provides for the distribution mechanism 810, 810' to intervene to implement workload distribution functionality on a per-request basis since all requests are channeled through the distribution mechanism 810, 810'.

What is claimed is:

1. A computer-implemented system for sending an outgoing message, the outgoing message including a message header in Common Object Request Broker Architecture (CORBA) type format and a message body in an implementation-specific format, the system comprising:

an external CORBA Object Request Broker (ORB) element configured to convert the header of the outgoing message to a General Inter-ORB Protocol (GIOP) type format and configured to send the header and body in GIOP type format to a target CORBA ORB; and an internal CORBA ORB element associated with an originating server configured to convert the body of the outgoing message to CORBA GIOP type format, and configured to provide the header in implementation-specific format with the body in CORBA GIOP type format to a distribution mechanism for forwarding to the external CORBA ORB element.

2. The computer-implemented system of claim 1, wherein the implementation-specific format is a graph of objects.

3. The computer-implemented system of claim 2, wherein communication between the external CORBA ORB element and the internal CORBA ORB element is provided by the distribution mechanism.

4. The computer-implemented system of claim 3, wherein communication of an item of data in implementation-specific format includes serializing the item of data.

* * * * *